(12) United States Patent
Lee et al.

(10) Patent No.: US 12,487,357 B1
(45) Date of Patent: Dec. 2, 2025

(54) APPARATUS AND METHOD FOR PSEUDO THERMAL LIGHT SOURCE GHOST IMAGING AND RANGE SENSING USING NARROW-BAND SPONTANEOUS EMISSION

(71) Applicant: AGENCY FOR DEFENSE DEVELOPMENT, Daejeon (KR)

(72) Inventors: Suyong Lee, Daejeon (KR); Nam Hun Park, Daejeon (KR); Taek Jeong, Daejeon (KR); Jaesung Heo, Daejeon (KR); Yonggi Jo, Daejeon (KR); Jihwan Kim, Daejeon (KR); Duk Young Kim, Daejeon (KR); Zaeill Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 19/230,613

(22) Filed: Jun. 6, 2025

(30) Foreign Application Priority Data

Jul. 26, 2024 (KR) .......................... 10-2024-0099595

(51) Int. Cl.
 *G01C 3/08* (2006.01)
 *G01S 17/08* (2006.01)
(52) U.S. Cl.
 CPC .................................. *G01S 17/08* (2013.01)
(58) Field of Classification Search
 CPC ................................. G01S 7/282; G01S 17/08
 See application file for complete search history.

(56) References Cited

U.S. PATENT DOCUMENTS 10,190,916 B1 1/2019 Adams
10,394,103 B2 8/2019 Hyde et al.
(Continued)

FOREIGN PATENT DOCUMENTS

| JP | 2004347793 A | 12/2004 |
| KR | 102354495 B1 | 1/2022 |
| KR | 102503804 B1 | 2/2023 |

OTHER PUBLICATIONS

Lu, Hang et al. "Low-coherence semiconductor light sources: devices and applications." NPJ Nanophotonics 1, Article No. 9 (2024). Pub. Jun. 3, 2024. (Year: 2024).*

(Continued)

*Primary Examiner* — Samantha K Nickerson
(74) *Attorney, Agent, or Firm* — Dilworth & Barrese, LLP.; Michael J. Musella, Esq.

(57) ABSTRACT

An apparatus for pseudo thermal light source ghost imaging and range sensing using narrow-band spontaneous emission includes: a pseudo thermal light source including a resonator type laser diode; a temperature controller configured to control a temperature of the pseudo thermal light source; a current controller configured to control a current of the pseudo thermal light source; a beam splitter configured to split a laser beam emitted from the pseudo thermal light source into a first beam and a second beam; and a temporal correlator configured to infer a target range to an object through temporal coherence between the first beam and the second beam, wherein the pseudo thermal light source oscillates a laser beam having second order coherence when a specific current is applied according to temperature.

15 Claims, 8 Drawing Sheets

(56) References Cited

U.S. PATENT DOCUMENTS

2018/0143303 A1    5/2018    Colosimo
2024/0184124 A1*  6/2024    Altaqui .............. G02B 27/0179

OTHER PUBLICATIONS

Tan, Peng Kian et al. "Practical Range Sensing with Thermal Light." Phys. Rev. Applied 20, 014060. Pub. Jul. 27, 2023. https://journals.aps.org/prapplied/abstract/10.1103/PhysRevApplied.20.014060 (Year: 2023).*
Notice of Allowance in Korean Application No. 10-2024-0099595 dated Oct. 10, 2024.
Schmidt et al; "High power narrow-band fiber-based ASE source", Optics Express 19(5), p. 4421-4427 (2011).
Tan et al; "Practical Range Sensing with Thermal Light", Physical Review Applied 20, 014060 (2023).
Zhou et al; "Superbunching pseudothermal light", Physical Review A 95, 053809 (2017).

\* cited by examiner

APPARATUS AND METHOD FOR PSEUDO THERMAL LIGHT SOURCE GHOST IMAGING AND RANGE SENSING USING NARROW-BAND SPONTANEOUS EMISSION

CROSS-REFERENCE TO RELATED APPLICATION

This application claims priority to and the benefit of Korean Patent Application No. 10-2024-0099595 filed with the Korean Intellectual Property Office on Jul. 26, 2024, the entire contents of which are incorporated herein by reference.

BACKGROUND

(a) Field

The present disclosure relates to an apparatus and a method for pseudo thermal light source ghost imaging and range sensing using narrow-band spontaneous emission.

(b) Description of the Related Art

In conventional ghost imaging technology, coherence between optical spatial pattern information and a single pixel detector signal with respect to light reflected from an object is calculated using a spatial light modulator and a single pixel detector to obtain an image of the object.

The light sources for ghost imaging mainly include quantum light sources and classical light sources. The quantum light is in a quantum-entangled state. The use of the quantum-entangled light enables strong imaging against external noise, but limits an increase in the intensity of the quantum light.

The classical light sources include laser light sources and thermal light sources. A laser light source is applied to laser lidar (LADAR) because the phase precision is very high due to the nature of coherent light although the time interval between photons is random. However, when a laser beam is split into two beams, there is no second order coherence between the two beams, so a second order coherence value (a degree of second order coherence or an intensity temporal correlation function) is 1. Therefore, to detect a range to a target, it is required to use a pulsed laser, rather than a continuous wave laser, or to modulate the laser beam.

A thermal light source may be applied to detect an object because there is temporal coherence between photons due to the bunching phenomenon between the photons although the phase is random. The thermal light source is artificially generated, mainly by transmitting laser light through rotating ground glass or modulating laser light with an amplitude modulation device, or using a narrow-band wavelength filter or an optical fiber for a broad-band spontaneous emission signal at a lasing threshold or lower of a laser. In the conventional ghost imaging, an image of a target is generated by calculating coherence with spatial pattern information obtained by modulating a spatial distribution using a spatial pattern generator, but in this way alone, it is not possible to obtain a temporal coherence signal with a narrow linewidth at a super bunching value greater than 2 simultaneously with the imaging. In addition, the method in which ground glass is applied has a limit in increasing the rotation speed of the ground glass, so the temporal coherence signal has a linewidth of several microseconds, and at this time, the pseudo thermal light source generates speckle spatially, resulting in low spatial coherence, which may cause a large loss when it is attempted to image an object using a single-mode optical fiber. In addition, in the digitally-implemented method in which amplitude modulation is applied, crosstalk may occur between electronic board channels, and there is a risk that the modulation patterns are easily taken over by the opponents. In addition, in a thermal light source in which a narrow-band wavelength filter is applied to a broad-band spontaneous emission signal, the wider the wavelength filter width, the shorter the time of coherence of the photon, requiring an expensive single photon detector. Therefore, it is required that a wavelength filter width be very narrow, which lowers the intensity accordingly. In addition, in a method in which a spontaneous emission signal based on an optical fiber is output, it is required to additionally apply a technique for suppressing stimulated Brillouin scattering and stimulated Raman scattering that occur within the optical fiber.

SUMMARY

The present disclosure attempts to provide an apparatus and a method for pseudo thermal light source ghost imaging and range sensing using narrow-band spontaneous emission capable of performing imaging while obtaining information on a range to an object by using a new technique for generating a pseudo thermal light source as a light source for ghost imaging.

An exemplary embodiment of the present disclosure provides an apparatus for pseudo thermal light source ghost imaging and range sensing using narrow-band spontaneous emission, the apparatus including: a pseudo thermal light source including a resonator type laser diode; a temperature controller configured to control a temperature of the pseudo thermal light source; a current controller configured to control a current of the pseudo thermal light source; a beam splitter configured to split a laser beam emitted from the pseudo thermal light source into a first beam and a second beam; and a temporal correlator configured to infer a target range to an object through temporal coherence between the first beam and the second beam, wherein the pseudo thermal light source oscillates a laser beam having second order coherence when a specific current is applied according to temperature.

The laser diode may generate a bunching laser beam with a second order coherence value greater than 2 at an oscillation threshold value or higher.

The pseudo thermal light source may generate a laser beam without separately requiring ground glass or a modulation device and without noise caused by stimulated Brillouin scattering and stimulated Raman scattering due to an optical fiber.

The current and the temperature at which the laser diode is allowed to oscillate a laser beam having second order coherence may be inversely proportional to each other.

The temperature controller may control a temperature of the laser diode, and the current controller may control a current of the laser diode, thereby controlling a linewidth of a second order coherence signal measured by the temporal correlator.

The apparatus may further include: a spatial light modulator configured to modulate the first beam incident through the beam splitter into a specific spatial pattern, and emit the modulated first beam toward the object; a spatial pattern generator configured to generate a spatial pattern for imaging the object, and transmit the generated spatial pattern to the spatial light modulator; and an imaging calculator configured to calculate coherence between the spatial pattern transmitted from the spatial pattern generator and a result of measuring the first beam to obtain an image of the object.

The apparatus may further include: a first single photon detector configured to transmit a result of measuring the second beam to the temporal correlator; and a second single photon detector configured to transmit a result of measuring the first beam incident after being reflected by the object to the temporal correlator, wherein the first single photon detector and the second single photon detector perform simultaneous measurements.

Another exemplary embodiment of the present disclosure provides an apparatus for pseudo thermal light source ghost imaging and range sensing using narrow-band spontaneous emission, the apparatus including: a pseudo thermal light source configured to oscillate a laser beam having second order coherence when a specific current is applied according to a temperature; a temporal correlator configured to infer a target range to an object through temporal coherence between a first beam and a second beam split from the laser beam; and an imaging calculator configured to calculate coherence between a spatial pattern of the first beam and a result of measuring the first beam to obtain an image of the object.

The apparatus may further include: a temperature controller configured to control a temperature of the pseudo thermal light source; and a current controller configured to control a current of the pseudo thermal light source, wherein the temperature controller controls the temperature of the pseudo thermal light source, and the current controller controls the current of the pseudo thermal light source, thereby controlling a linewidth of a second order coherence signal measured by the temporal correlator.

The pseudo thermal light source may generate a bunching laser beam with a second order coherence value greater than 2 at an oscillation threshold value or higher.

The current and the temperature at which the pseudo thermal light source is allowed to oscillate a laser beam having second order coherence may be inversely proportional to each other.

Another exemplary embodiment of the present disclosure provides a method for pseudo thermal light source ghost imaging and range sensing using narrow-band spontaneous emission, the method including: controlling, by a temperature controller, a temperature of a pseudo thermal light source including a resonator type laser diode; controlling, by a current controller, a current of the pseudo thermal light source; oscillating, by the pseudo thermal light source, a laser beam having second order coherence when a specific current is applied according to the temperature; splitting, by a beam splitter, the laser beam emitted from the pseudo thermal light source into a first beam and a second beam; and inferring, by a temporal correlator, a target range to an object through temporal coherence between the first beam and the second beam.

The laser diode may generate a bunching laser beam with a second order coherence value greater than 2 at an oscillation threshold value or higher.

The pseudo thermal light source generates a laser beam without separately requiring ground glass or a modulation device and without noise caused by stimulated Brillouin scattering and stimulated Raman scattering due to an optical fiber.

The current and the temperature at which the laser diode is allowed to oscillate a laser beam having second order coherence may be inversely proportional to each other.

The temperature controller controls a temperature of the laser diode, and the current controller controls a current of the laser diode, thereby controlling a linewidth of a second order coherence signal measured by the temporal correlator.

The method may further include: generating, by a spatial pattern generator, a spatial pattern for imaging the object; modulating, by a spatial light modulator, the first beam incident through the beam splitter into the spatial pattern and emitting the modulated first beam toward the object; and calculating, by an imaging calculator, coherence between the spatial pattern transmitted from the spatial pattern generator and a result of measuring the first beam to obtain an image of the object.

The apparatus and the method for pseudo thermal light source ghost imaging and range sensing using narrow-band spontaneous emission according to exemplary embodiments of the present disclosure are capable of performing imaging while obtaining information on a range to an object using the pseudo thermal light source.

In addition, the pseudo thermal light source using narrow-band spontaneous emission according to an exemplary embodiment of the present disclosure has a linewidth as narrow as a laser, not requiring a narrow-band filter for creating a thermal light source with a long coherence time, and is safe against enemies taking over modulation patterns because the quantum-mechanical spontaneous emission is based on natural randomness, unlike artificial modulation.

In addition, no speckle occurs and a single mode optical fiber can be applied, enabling single-pixel ghost imaging using a spatial light modulator.

Conventional ghost imaging requires performing imaging after obtaining information on a range to an object in advance through a separate light source, but in the exemplary embodiments of the present disclosure, imaging can be performed while obtaining information on a range to an object by measuring a second order coherence value without a separate device.

DETAILED DESCRIPTION

Hereinafter, exemplary embodiments of the present disclosure will be described in detail with reference to the accompanying drawings, so that they can be easily carried out by those having ordinary knowledge in the art to which the present disclosure pertains. The present disclosure may be implemented in various different forms, and is not limited to the exemplary embodiments described herein.

In order to clearly explain the present disclosure, parts irrelevant to the description will be omitted, and identical or similar parts will be denoted by the same reference numerals throughout the specification.

Throughout the specification, when a certain part is referred to as "including" a certain component, this implies the presence of other components, not precluding the presence of other components, unless explicitly stated to the contrary.

Figure 1:
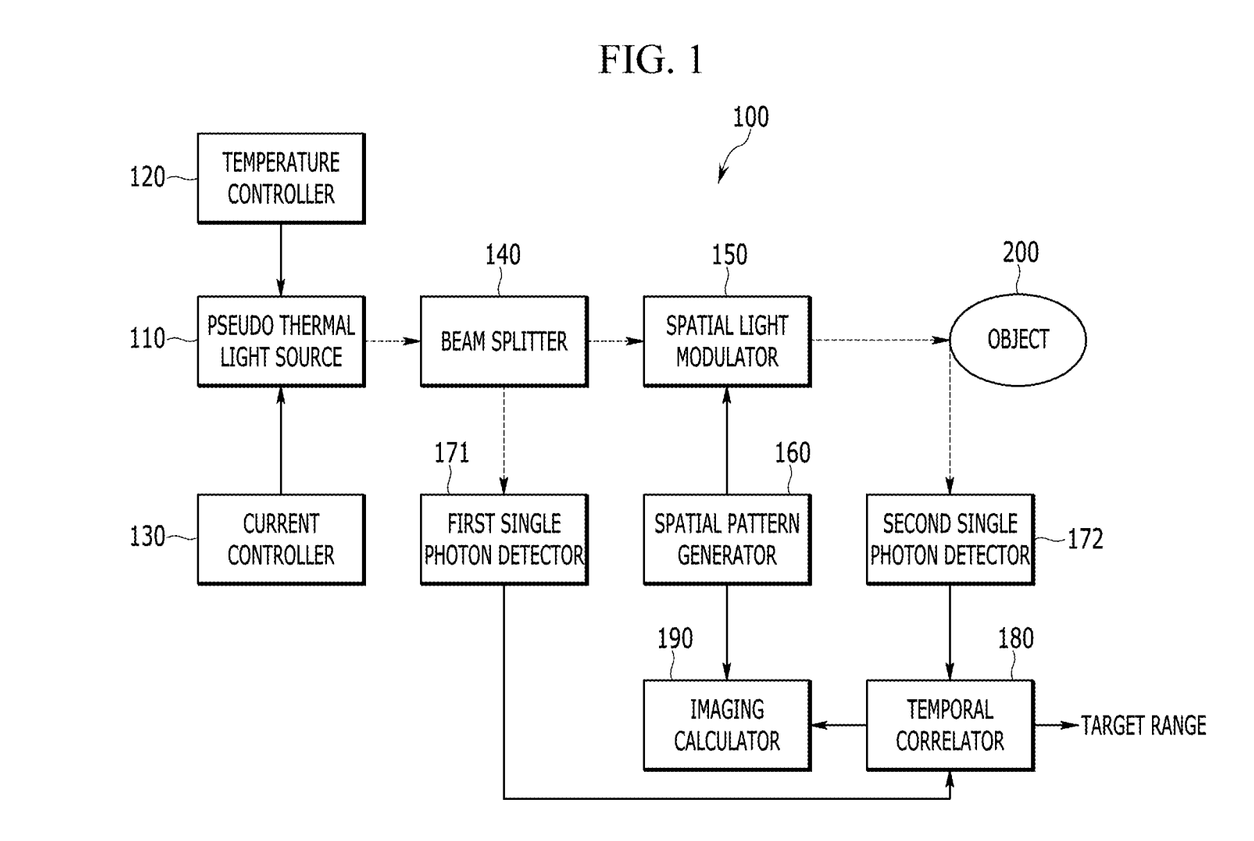
FIG. 1 is a block diagram illustrating an apparatus for pseudo thermal light source ghost imaging and range sensing using narrow-band spontaneous emission according to an exemplary embodiment of the present disclosure.

FIG. 1 is a block diagram illustrating an apparatus for pseudo thermal light source ghost imaging and range sensing using narrow-band spontaneous emission according to an exemplary embodiment of the present disclosure.

Referring to FIG. 1, an apparatus 100 for pseudo thermal light source ghost imaging and range sensing using narrow-band spontaneous emission according to an exemplary embodiment of the present disclosure may include a pseudo thermal light source 110, a temperature controller 120, a current controller 130, a beam splitter 140, a spatial light modulator 150, a spatial pattern generator 160, a first single photon detector 171, a second single photon detector 172, a temporal correlator 180, and an imaging calculator 190.

The pseudo thermal light source 110 may oscillate a laser beam at a lasing threshold current value or higher at a specific temperature. The pseudo thermal light source 110 may include a resonator type laser diode. The pseudo thermal light source 110 may include a Fabry-Perot resonator type laser diode as a resonator type laser diode. The Fabry-Perot resonator type laser diode includes SFL1550P manufactured by THORLABS as an example. The Fabry-Perot resonator type laser diode may be designed and manufactured to perform well at a temperature of 25° C. to oscillate a laser beam at the lasing threshold current or higher. However, when the Fabry-Perot resonator type laser diode deviates from the specific temperature and the specific current, going against the Fabry-Perot resonance conditions, the Fabry-Perot resonator type laser diode stops oscillating the laser beam even at the lasing threshold current or higher. That is, the pseudo thermal light source 110 may emit a laser beam using spontaneous emission at the specific temperature and the specific current.

The temperature controller 120 may control a temperature of the pseudo thermal light source 110 to the specific temperature at which the pseudo thermal light source 110 is allowed to emit a laser beam.

The current controller 130 may apply a current to the pseudo thermal light source 110 at the specific current value allowing the pseudo thermal light source 110 to emit a laser beam at the specific temperature. That is, the current controller 130 may control a current of the pseudo thermal light source 110.

The beam splitter 140 may split the laser beam emitted from the pseudo thermal light source 110 into two beams (signal and idler), and send the first beam (signal) to the spatial light modulator 150 and send the second beam (idler) to the first single photon detector 171. The beam splitter 140 may include at least one of an optical fiber splitter and a polarizing beam splitter.

The spatial light modulator 150 may modulate the first beam incident through the beam splitter 140 into a specific spatial pattern, and emit the modulated the first beam toward an object 200.

The spatial pattern generator 160 may generate a spatial pattern for imaging the object 200, and transmit the generated spatial pattern to the spatial light modulator 150 and the imaging calculator 190. The generated spatial pattern may be a pattern that controls a plurality of pixels to be turned on or off.

The spatial light modulator 150 may modulate the first beam into the specific spatial pattern including a highest luminance portion corresponding to the turn-on of the pixels and a lowest luminance portion corresponding to the turn-off of the pixel according to the spatial pattern transmitted from the spatial pattern generator 160. The modulated first beam may be reflected by the object 200 and incident on the second single photon detector 172.

The first single photon detector 171 may transmit a result of measuring the second beam to the temporal correlator 180, and the second single photon detector 172 may transmit a result of measuring the first beam incident after being reflected by the object 200 to the temporal correlator 180.

The first single photon detector 171 and the second single photon detector 172 may perform simultaneous measurements, and the temporal correlator 180 can measure temporal coherence between the first beam (signal) and the second beam (idler). The temporal correlator 180 may infer a target range to the object 200 through the temporal coherence between the first beam and the second beam.

The imaging calculator 190 may calculate coherence between the spatial pattern transmitted from the spatial pattern generator 160 and the result of measuring the first beam transmitted through the temporal correlator 180. The spatial pattern generator 160 may generate various types of spatial patterns so that first beam is modulated into various spatial patterns through the spatial light modulator 150, and results of measuring the first beam measured by the second single photon detector 172 can be provided to the imaging calculator 190 to correspond to the various types of spatial patterns. The imaging calculator 190 may calculate coherence between the various types of spatial patterns and the first beam measurement results corresponding to the respective spatial patterns, and accumulate calculation results to obtain an image of the object 200 (or target).

Hereinafter, the pseudo thermal light source using narrow-band spontaneous emission will be described in more detail.

Figure 2:
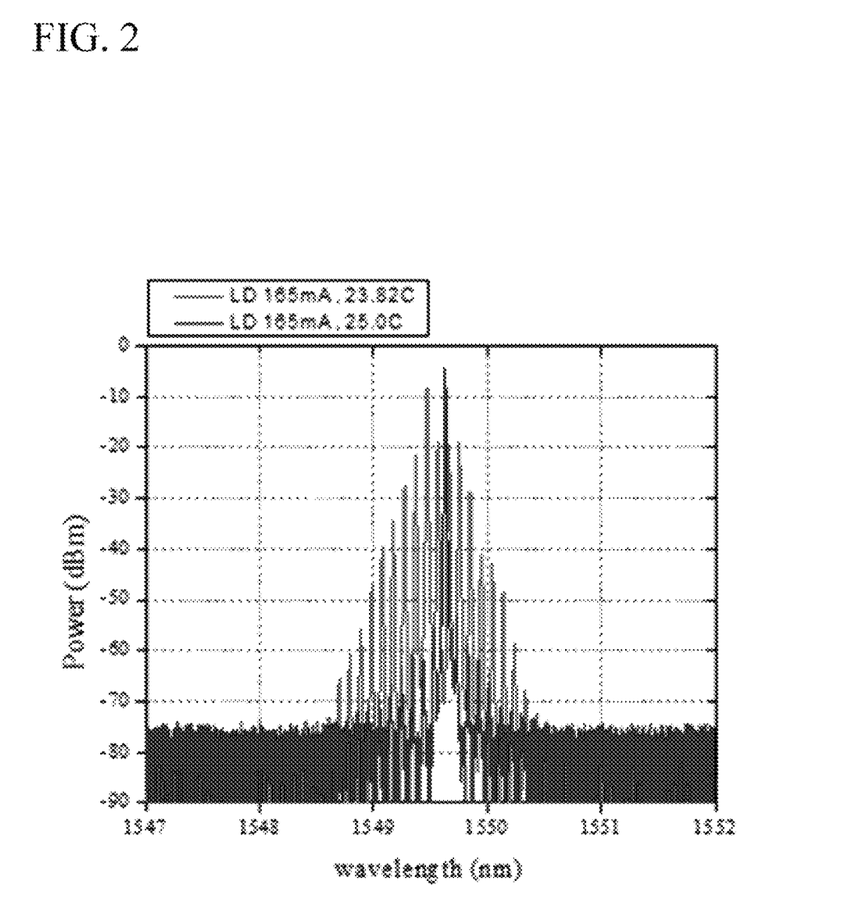
FIG. 2 illustrates a laser oscillation signal of a pseudo thermal light source using narrow-band spontaneous emission according to an exemplary embodiment of the present disclosure.

FIG. 2 illustrates a laser oscillation signal of the pseudo thermal light source using narrow-band spontaneous emission according to an exemplary embodiment of the present disclosure.

Referring to FIG. 2, when a current of 165 mA is applied to a laser diode LD, which is the pseudo thermal light source 110, spectrums of laser beams oscillated according to the temperatures (23.82° C. and 25.0° C.) are compared. When the temperature of the laser diode LD is 25.0° C., it can be seen that a laser beam is oscillated in one mode (a linewidth of 5 μm or less) at a wavelength of 1549.5 nm, and the amplitude is constant. On the other hand, when the temperature of the laser diode LD is 23.82° C., it can be seen that random amplitude modulation occurs as a laser beam is generated in multiple modes (linewidths of about 5 μm in each mode) at wavelengths of around 1549.5 nm. At this time, when a degree of second order coherence $g^2$ of the laser beam generated from the laser diode LD is measured, a signal greater than 1 is measured, which is a characteristic of the pseudo thermal light source.

Figure 3:
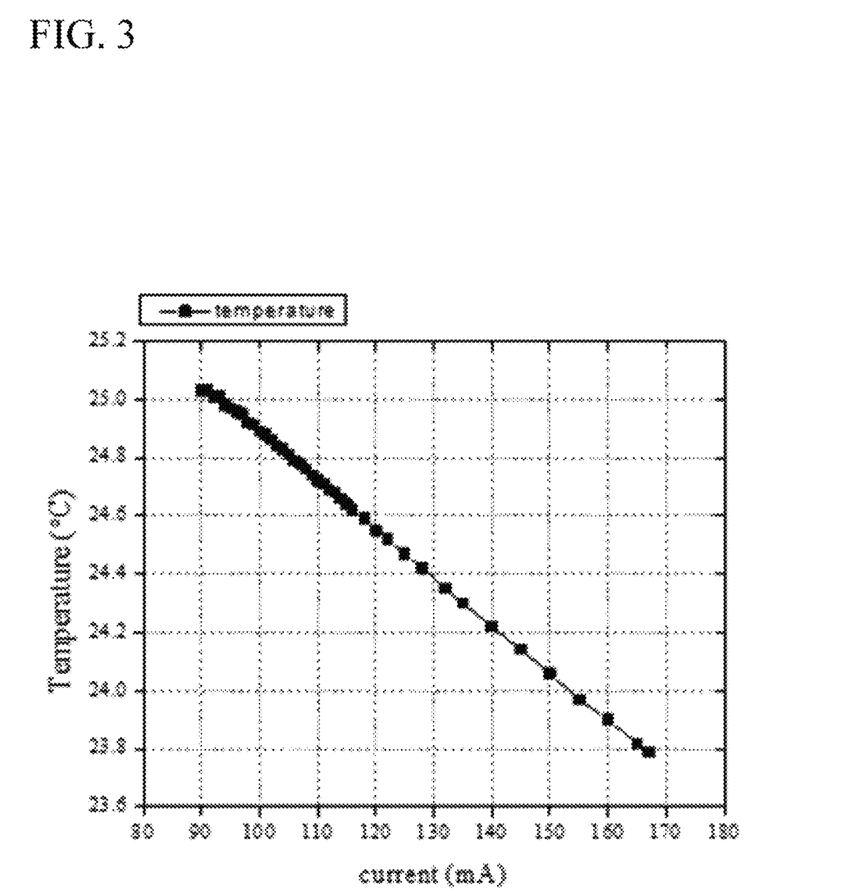
FIG. 3 illustrates current and temperature conditions of the pseudo thermal light source using narrow-band spontaneous emission according to an exemplary embodiment of the present disclosure.

FIG. 3 illustrates current and temperature conditions of the pseudo thermal light source using narrow-band spontaneous emission according to an exemplary embodiment of the present disclosure.

Referring to FIG. 3, a result of detecting current and temperature conditions of the laser diode under which a laser beam having second order coherence $g^2$ is generated is shown. As an example, the current controller 130 applies a current of 90 mA to the laser diode serving as the pseudo thermal light source 110, a spectrum is measured as in FIG. 2 and an amplitude change is measured with an oscilloscope (not shown) at the same time while the temperature controller 120 controls the temperature of the laser diode by 0.01° C. each time, and the temporal correlator 180 measures a second order coherence $g^2$ signal, thereby detecting a temperature condition (e.g., 25.03° C.) under which the second order coherence $g^2$ occurs. When the current controller 130 changes the current of the laser diode to a next current value (e.g., 92 mA) under the temperature condition of 25.03° C., no second order coherence $g^2$ is observed. Thus, the temperature controller 120 may detect a temperature condition (e.g., 25.01° C.) under which second order coherence $g^2$ occurs by adjusting the temperature of the laser diode by 0.01° C. each time around 25.03° C.

In this way, the current and temperature conditions of the laser diode under which a laser beam having second order coherence $g^2$ is generated can be detected. As exemplified in FIG. 3, the current and temperature at which the laser diode is allowed to oscillate a laser beam having second order coherence $g^2$ may be inversely proportional to each other.

In this manner, the pseudo thermal light source 110 may oscillate a laser beam having second order coherence $g^2$ when a specific current is applied according to the temperature. At this time, the laser diode serving as the pseudo thermal light source 110 may generate a super bunching laser beam with a second order coherence $g^2$ value greater than 2 when the current has an oscillation threshold value (lasing threshold current) or higher.

In other words, the pseudo thermal light source 110 may oscillate a laser beam having second order coherence $g^2$ at a specific temperature according to the applied current. The temperature controller 120 may control the temperature of the pseudo thermal light source 110 to a specific temperature corresponding to the current applied to the pseudo thermal light source 110, so that the pseudo thermal light source 110 can oscillate a laser beam having second order coherence $g^2$. In addition, the current controller 130 may control the current of the pseudo thermal light source 110 to a specific current corresponding to the temperature of the pseudo thermal light source 110, so that the pseudo thermal light source 110 can oscillate a laser beam having second order coherence $g^2$.

Meanwhile, the linewidth of the second order coherence $g^2$ signal may vary depending on current and temperature conditions, which may be related to a range resolution. This will be explained with reference to FIGS. 4 and 5.

Figure 4:
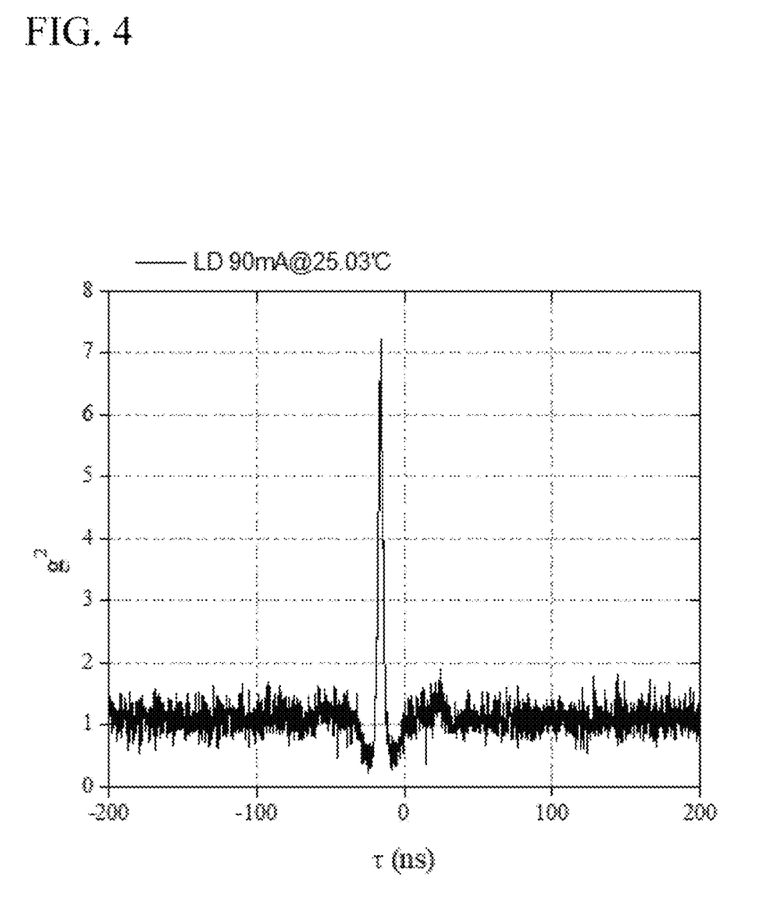
FIGS. 4 and 5 illustrate examples of second order coherence signals each depending on the current and temperature of the pseudo thermal light source using narrow-band spontaneous emission according to an exemplary embodiment of the present disclosure.
Figure 5:
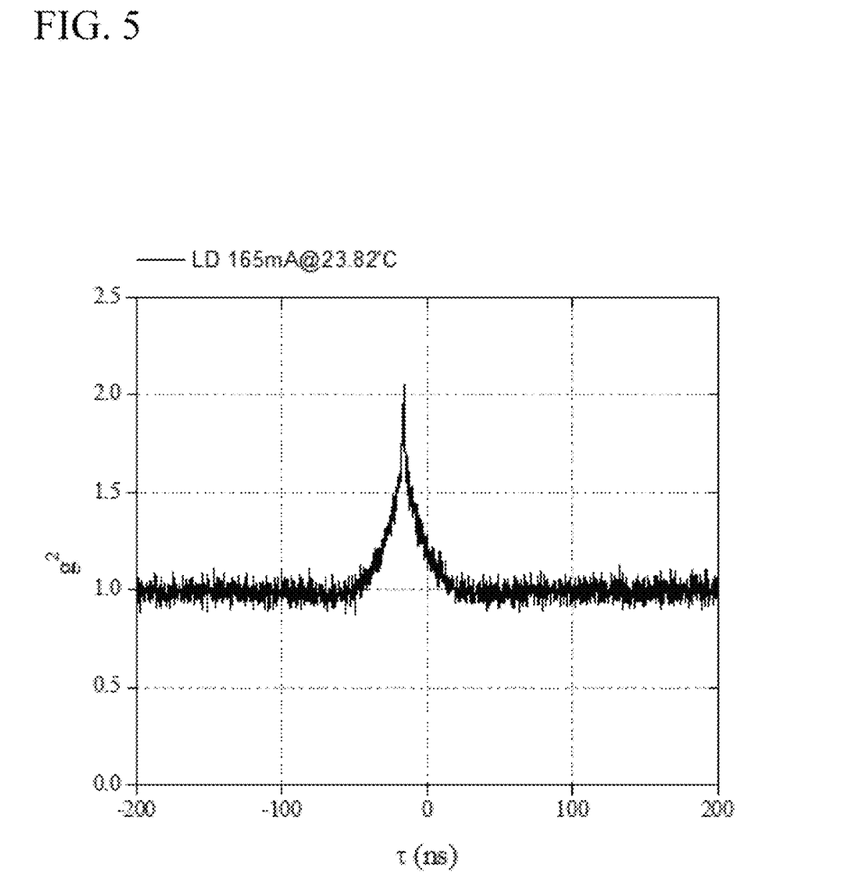

FIGS. 4 and 5 illustrate examples of second order coherence signals each depending on the current and temperature of the pseudo thermal light source using narrow-band spontaneous emission according to an exemplary embodiment of the present disclosure.

Referring to FIGS. 4 and 5, the linewidth of the second order coherence $g^2$ signal can be controlled by controlling the current and temperature of the laser diode LD serving as the pseudo thermal light source 110. As exemplified in FIG. 4, when the laser diode LD has a current of 90 mA and a temperature of 25.03° C., the second order coherence $g^2$ signal (temporal coherence signal) has a linewidth of about 4.4 ns. As exemplified in FIG. 5, when the laser diode LD has a current of 165 mA and a temperature of 23.82° C., the second order coherence $g^2$ signal (temporal coherence signal) has a linewidth of about 14 ns. Here, + and − of the time axis (τ) may be determined depending on whether which one is used as a reference between the first single photon detector 171 or the second single photon detector 172.

In other words, the linewidth of the second order coherence $g^2$ signal measured by the temporal correlator 180 may be adjusted according to the current and temperature of the pseudo thermal light source 110, and the current and temperature of the pseudo thermal light source 110 may be adjusted in consideration of the target range resolution. That is, among current and temperature conditions under which the pseudo thermal light source 110 is allowed to oscillate a laser beam having second order coherence $g^2$, the temperature controller 120 and the current controller 130 may control the temperature and the current by selecting an appropriate temperature and an appropriate current so that a linewidth of a second order coherence $g^2$ signal can be formed according to the desired target range resolution when the temporal correlator 180 infers a target range.

Figure 6:
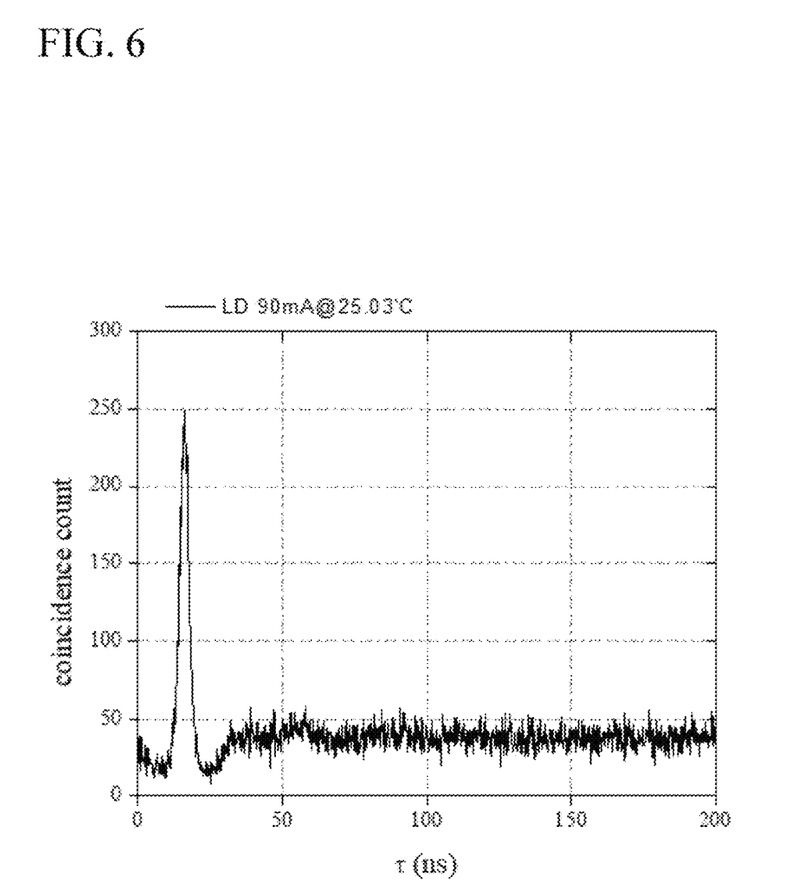
FIGS. 6 and 7 illustrate examples of coincidence counts each for measuring a target range depending on the current and temperature of the pseudo thermal light source using narrow-band spontaneous emission according to an exemplary embodiment of the present disclosure.
Figure 7:
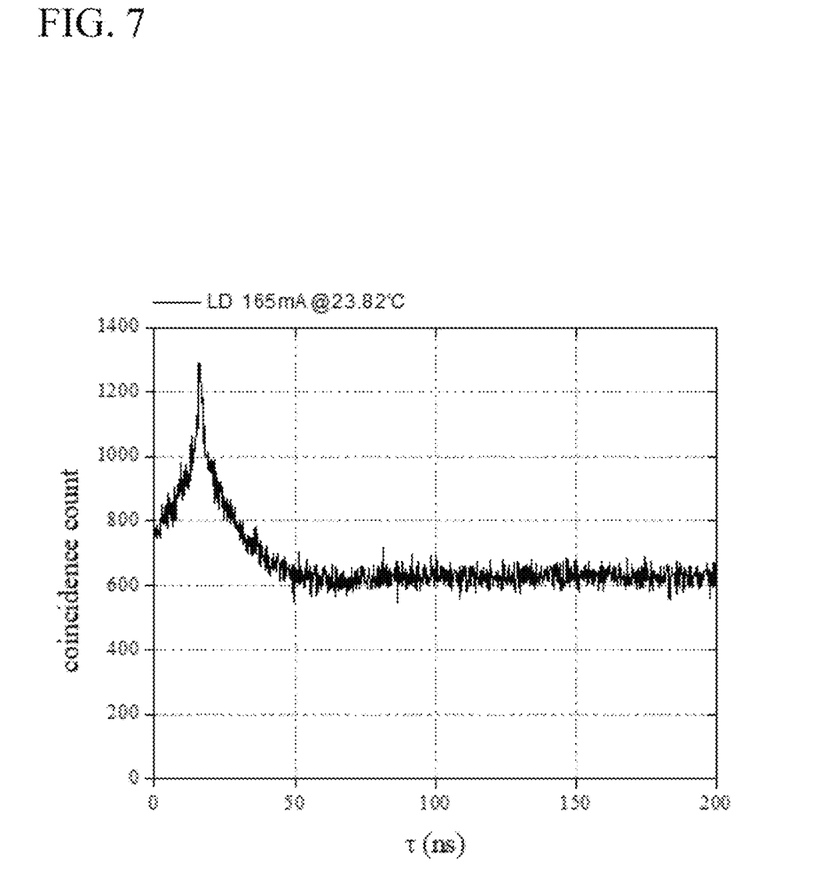

FIGS. 6 and 7 illustrate examples of coincidence counts each for measuring a target range depending on the current and temperature of the pseudo thermal light source using narrow-band spontaneous emission according to an exemplary embodiment of the present disclosure.

Referring to FIGS. 6 and 7, the first single photon detector 171 and the second single photon detector 172 perform simultaneous measurements, and the temporal correlator 180 measures a coincidence count. At this time, the window of simultaneous measurements may be 176 ps.

As exemplified in FIG. 6, when the laser diode LD has a current of 90 mA and a temperature of 25.03° C., the coincidence count signal (temporal coherence signal) has a linewidth of about 4.4 ns. In addition, as exemplified in FIG. 7, when the laser diode LD has a current of 165 mA and a temperature of 23.82° C., the coincidence count signal (temporal coherence signal) has a linewidth of about 14 ns. The second order coherence $g^2$ values of FIGS. 4 and 5 are values obtained by normalizing the coincidence count signals of FIGS. 6 and 7 with their background value being set to 1.

Figure 8:
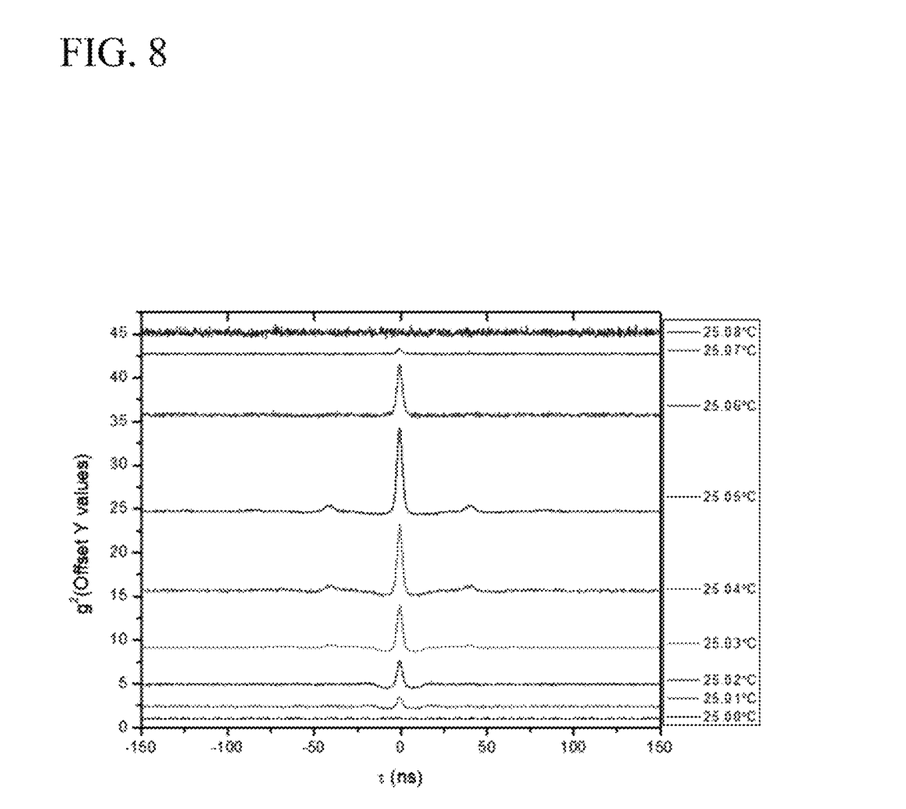
FIG. 8 illustrates a comparison between second order coherence results depending on the temperature when the pseudo thermal light source using narrow-band spontaneous emission has a current of 90 mA according to an exemplary embodiment of the present disclosure.

FIG. 8 illustrates a comparison between second order coherence results depending on the temperature when the pseudo thermal light source using narrow-band spontaneous emission has a current of 90 mA according to an exemplary embodiment of the present disclosure.

Referring to FIG. 8, an offset is set for a second order coherence $g^2$ value for each temperature to facilitate the comparison between the second order coherence $g^2$ results depending on the temperature. It can be seen that the second order coherence $g^2$ has the largest value at 25.05° C., and the second order coherence $g^2$ signal disappears at 25.00° C. and 25.08° C.

As described above, the temperature controller 120 controls the temperature of the resonator type laser diode serving as the pseudo thermal light source 110, and the current controller 130 controls the current of the laser diode, so that the laser diode can generate a super bunching laser beam with a second order coherence $g^2$ value greater than 2 at the oscillation threshold value or higher. At this time, the pseudo thermal light source 110 can generate a laser beam without separately requiring ground glass or a modulation device and without noise caused by stimulated Brillouin scattering and stimulated Raman scattering due to an optical fiber.

In addition, the temperature controller 120 controls the temperature of the resonator type laser diode serving as the pseudo thermal light source 110, and the current controller 130 controls the current of the laser diode, so that a linewidth of a second order coherence $g^2$ signal measured by the temporal correlator 180 can be controlled, and accordingly, a target range resolution can be controlled.

The pseudo thermal light source 110 can obtain a target range to the object 200 by measuring a second order coherence $g^2$ value using only the resonator type laser diode without a separate light source, and at the same time, can image the object 200.

The drawings referred to so far and the detailed description, presented as examples in describing the present disclosure, are used for illustrative purposes only, and are not intended to define meanings or limit the scope of the present disclosure set forth in the claims. It is to be understood by those skilled in the art that various modifications and other equivalent exemplary embodiments can be made therefrom. Therefore, the true technical protection scope of the present disclosure should be determined by the technical spirit of the appended claims.

What is claimed is:

1. An apparatus for pseudo thermal light source ghost imaging and range sensing using narrow-band spontaneous emission, the apparatus comprising:
    a pseudo thermal light source including a resonator type laser diode;
    a temperature controller configured to control a temperature of the pseudo thermal light source;
    a current controller configured to control a current of the pseudo thermal light source;
    a beam splitter configured to split a laser beam emitted from the pseudo thermal light source into a first beam and a second beam;
    a temporal correlator configured to infer a target range to an object through temporal coherence between the first beam and the second beam;
    a spatial light modulator configured to modulate the first beam incident through the beam splitter into a specific spatial pattern, and emit the modulated first beam toward the object;
    a spatial pattern generator configured to generate a spatial pattern for imaging the object, and transmit the generated spatial pattern to the spatial light modulator; and
    an imaging calculator configured to calculate coherence between the spatial pattern transmitted from the spatial pattern generator and a result of measuring the first beam to obtain an image of the object,
    wherein the pseudo thermal light source oscillates a laser beam having second order coherence when a specific current is applied according to temperature.

2. The apparatus of claim 1, wherein
    the laser diode generates a bunching laser beam with a second order coherence value greater than 2 at an oscillation threshold value or higher.

3. The apparatus of claim 2, wherein
    the pseudo thermal light source generates a laser beam without separately requiring ground glass or a modulation device and without noise caused by stimulated Brillouin scattering and stimulated Raman scattering due to an optical fiber.

4. The apparatus of claim 1, wherein
    the current and the temperature at which the laser diode is allowed to oscillate a laser beam having second order coherence are inversely proportional to each other.

5. The apparatus of claim 1, wherein
    the temperature controller controls a temperature of the laser diode, and the current controller controls a current of the laser diode, thereby controlling a linewidth of a second order coherence signal measured by the temporal correlator.

6. The apparatus of claim 1, further comprising:
    a first single photon detector configured to transmit a result of measuring the second beam to the temporal correlator; and
    a second single photon detector configured to transmit a result of measuring the first beam incident after being reflected by the object to the temporal correlator,
    wherein the first single photon detector and the second single photon detector perform simultaneous measurements.

7. An apparatus for pseudo thermal light source ghost imaging and range sensing using narrow-band spontaneous emission, the apparatus comprising:
    a pseudo thermal light source configured to oscillate a laser beam having second order coherence when a specific current is applied according to a temperature;
    a beam splitter configured to split a laser beam emitted from the pseudo thermal light source into a first beam and a second beam;
    a temporal correlator configured to infer a target range to an object through temporal coherence between the first beam and the second beam split by the beam splitter;
    a spatial light modulator configured to modulate the first beam incident through the beam splitter into a specific spatial pattern, and emit the modulated first beam toward the object;
    a spatial pattern generator configured to generate a spatial pattern for imaging the object, and transmit the generated spatial pattern to the spatial light modulator; and
    an imaging calculator configured to calculate coherence between the spatial pattern transmitted from the spatial pattern generator and a result of measuring the first beam to obtain an image of the object.

8. The apparatus of claim 7, further comprising:
    a temperature controller configured to control a temperature of the pseudo thermal light source; and
    a current controller configured to control a current of the pseudo thermal light source,
    wherein the temperature controller controls the temperature of the pseudo thermal light source, and the current controller controls the current of the pseudo thermal light source, thereby controlling a linewidth of a second order coherence signal measured by the temporal correlator.

9. The apparatus of claim 7, wherein
    the pseudo thermal light source generates a bunching laser beam with a second order coherence value greater than 2 at an oscillation threshold value or higher.

10. The apparatus of claim 7, wherein
    the current and the temperature at which the pseudo thermal light source is allowed to oscillate a laser beam having second order coherence are inversely proportional to each other.

11. A method for pseudo thermal light source ghost imaging and range sensing using narrow-band spontaneous emission, the method comprising:

controlling, by a temperature controller, a temperature of a pseudo thermal light source including a resonator type laser diode;

controlling, by a current controller, a current of the pseudo thermal light source;

oscillating, by the pseudo thermal light source, a laser beam having second order coherence when a specific current is applied according to the temperature;

splitting, by a beam splitter, the laser beam emitted from the pseudo thermal light source into a first beam and a second beam;

generating, by a spatial pattern generator, a spatial pattern for imaging the object;

modulating, by a spatial light modulator, the first beam incident through the beam splitter into the spatial pattern and emitting the modulated first beam toward the object;

inferring, by a temporal correlator, a target range to an object through temporal coherence between the first beam and the second beam; and calculating, by an imaging calculator, coherence between the spatial pattern transmitted from the spatial pattern generator and a result of measuring the first beam to obtain an image of the object.

12. The method of claim 11, wherein
the laser diode generates a bunching laser beam with a second order coherence value greater than 2 at an oscillation threshold value or higher.

13. The method of claim 12, wherein
the pseudo thermal light source generates a laser beam without separately requiring ground glass or a modulation device and without noise caused by stimulated Brillouin scattering and stimulated Raman scattering due to an optical fiber.

14. The method of claim 11, wherein
the current and the temperature at which the laser diode is allowed to oscillate a laser beam having second order coherence are inversely proportional to each other.

15. The method of claim 11, wherein
the temperature controller controls a temperature of the laser diode, and the current controller controls a current of the laser diode, thereby controlling a linewidth of a second order coherence signal measured by the temporal correlator.

* * * * *